United States Patent
Viano et al.

[11] Patent Number: 6,116,644
[45] Date of Patent: Sep. 12, 2000

[54] FRONTAL AIR BAG SYSTEM

[75] Inventors: David Charles Viano, Bloomfield Hills; Hans-Peter Gimbel, Trebur; Madana Gopal, Troy, all of Mich.

[73] Assignee: Delphi Technologies, Inc., Troy, Mich.

[21] Appl. No.: 09/363,061

[22] Filed: Jul. 29, 1999

Related U.S. Application Data

[63] Continuation-in-part of application No. 09/065,912, Apr. 24, 1998.

[51] Int. Cl.$^7$ .............................. B60R 21/16; B60R 21/13
[52] U.S. Cl. ...................................... 280/743.1; 280/743.2; 280/728.2
[58] Field of Search .............................. 280/743.1, 730.2, 280/730.1, 743.2, 749, 751, 753, 748

[56] References Cited

U.S. PATENT DOCUMENTS

| | | | |
|---|---|---|---|
| 5,362,097 | 11/1994 | Barske | 280/730.1 |
| 5,575,497 | 11/1996 | Suyama et al. | 280/730.1 |
| 5,833,304 | 11/1998 | Daniel et al. | 296/214 |
| 5,865,462 | 2/1999 | Robins et al. | 280/730.2 |
| 5,924,723 | 7/1999 | Brantman et al. | 280/730.2 |

OTHER PUBLICATIONS

U.S. application No. 09/065,912, Viano et al., filed Apr. 24, 1998.

*Primary Examiner*—Brian L. Johnson
*Assistant Examiner*—Tony Winner
*Attorney, Agent, or Firm*—Kathryn A. Marra

[57] ABSTRACT

A frontal air bag system for a vehicle including an inflator mounted to vehicle structure and a frontal air bag operatively connected to the inflator and mounted to an A-pillar and header of the vehicle. The frontal air bag system also includes a wrap air bag at least partially continuous with the frontal air bag. The frontal air bag and the wrap air bag are mounted to an A-pillar of the vehicle. The frontal air bag and the wrap air bag are inflated by the inflator and the frontal air bag is extended downward and in front of an occupant seated in the vehicle and the wrap air bag is extended above the frontal air bag.

21 Claims, 4 Drawing Sheets

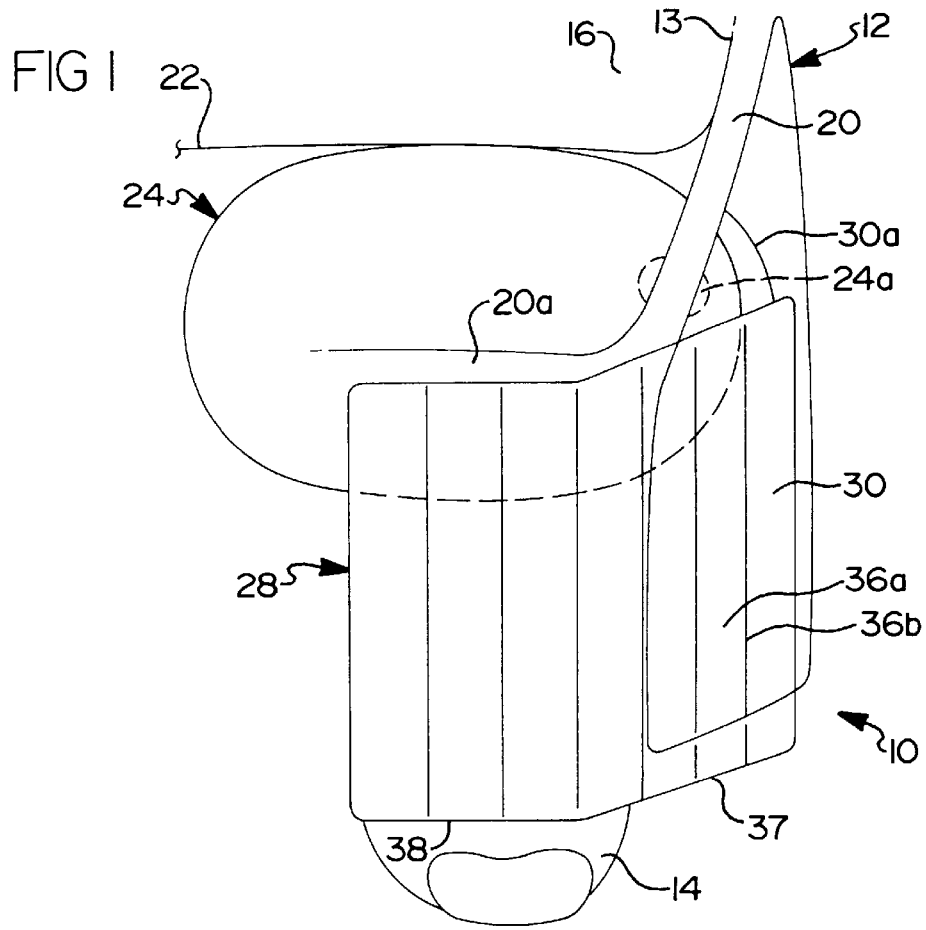
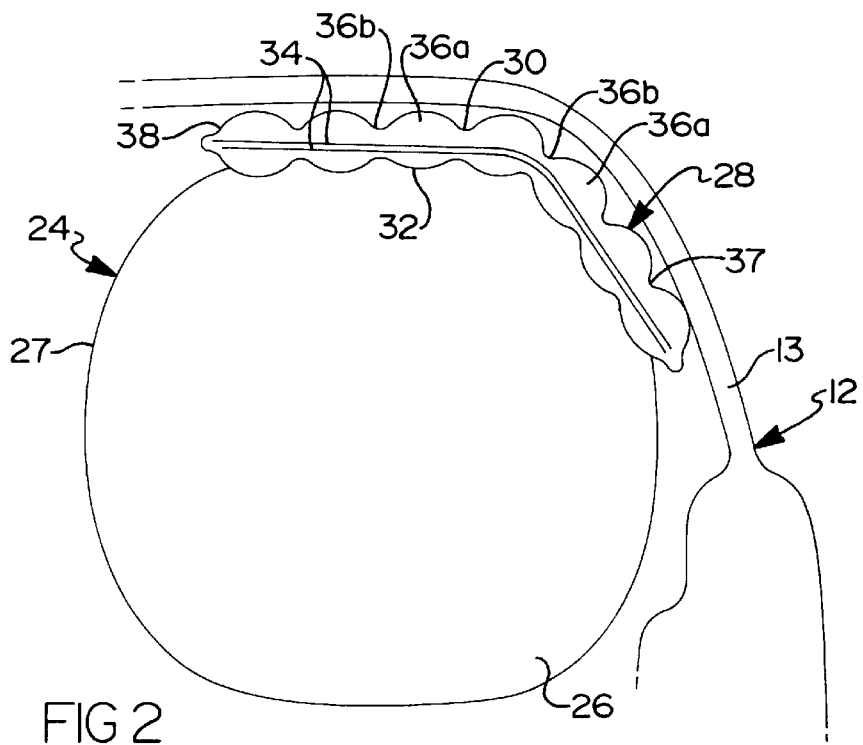

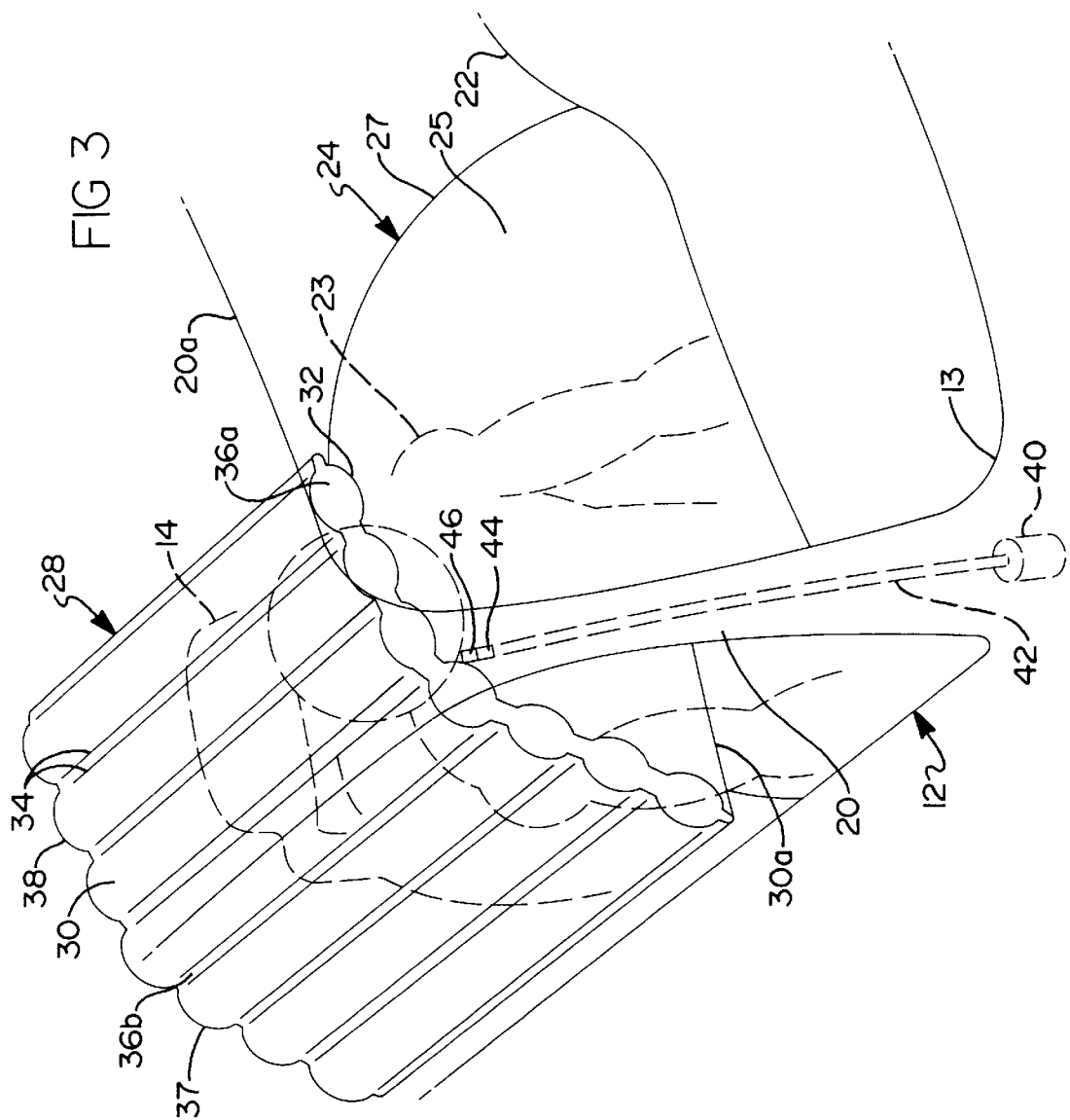

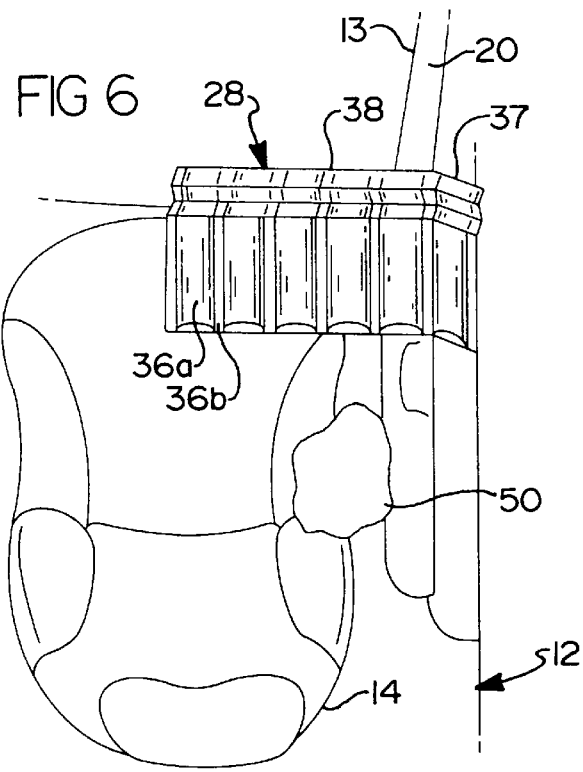
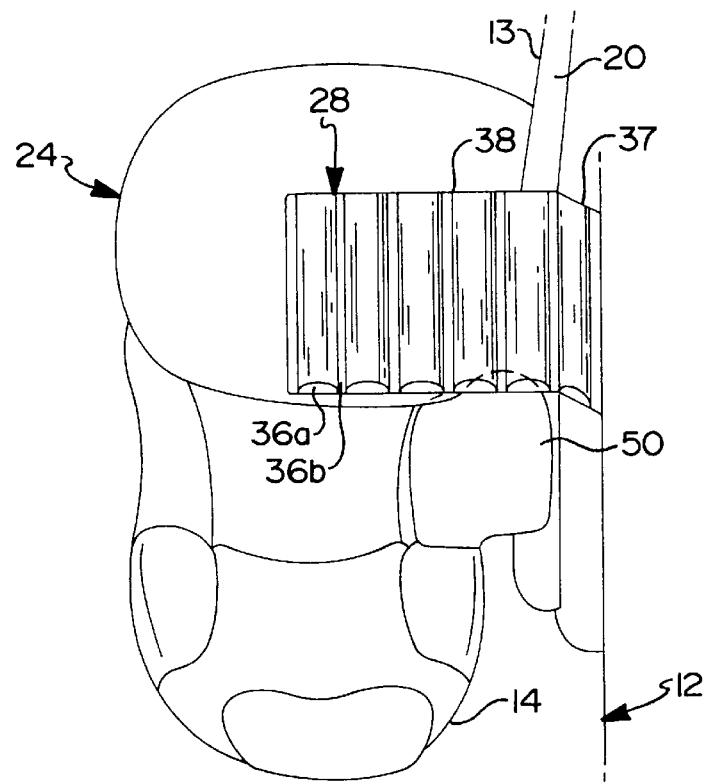

FRONTAL AIR BAG SYSTEM

CROSS-REFERENCE TO RELATED APPLICATION(S)

The present application is a continuation-in-part of pending application Ser. No. 09/065,912, filed Apr. 24, 1998 and entitled "AIR BAG ASSEMBLY".

TECHNICAL FIELD

The present invention relates generally to inflatable restraint systems for vehicles and, more particularly, to a frontal air bag system for a vehicle with a convertible or open-air top.

BACKGROUND OF THE INVENTION

It is known to provide an inflatable restraint system in a vehicle to augment protection traditionally afforded vehicle occupants through the use of seat belts and other components of a friendly interior of the vehicle. In some vehicles, the inflatable restraint system may be an air bag system disposed within an interior or occupant compartment in the vehicle in close proximity to either a driver occupant or one or more passenger occupants. Typically, the air bag system includes an air bag module attached to vehicle steering system or instrument panel structures and having an air bag for deployment through an opening in a cover to extend into an occupant compartment of the vehicle. The deployed air bag restrains movement of the occupant to help protect the occupant during a collision.

It is also known to provide frontal air bags for forward protection of an occupant in a convertible type vehicle. The frontal air bag is typically provided in a vehicle steering wheel for protection of the driver occupant and another air bag is provided in the instrument panel for protection of the passenger occupant. Further, these vehicles may include a seat mounted combination torso and head side air bag. As a result, the air bag module for each air bag is self-contained and electronically connected to a diagnostic module and sensors that trigger inflation.

Although the above air bag systems have worked well for a convertible type vehicle, it is desirable to provide a frontal air bag system that also further helps to protect an occupant from striking an A-pillar of the vehicle in oblique frontal impacts on the vehicle involving near-seated occupants. It is also desirable to provide a frontal air bag system for a convertible type vehicle that is lightweight, and that reduces the need for electrical connections and components in current air bag modules. It is further desirable to provide a frontal air bag system for a convertible type vehicle to deploy a frontal air bag from an A-pillar and interface with a seat-mounted combination air bag. Therefore, there is a need in the art to provide an improved frontal air bag system for a convertible type vehicle that includes a portion of an air bag that remains inflated to help protect occupants in rollover or longer duration impacts on the vehicle.

SUMMARY OF THE INVENTION

It is, therefore, one object of the present invention to provide a frontal air bag system for a convertible type vehicle.

It is another object of the present invention to provide a frontal air bag system for a convertible type vehicle that deploys an air bag from an A-pillar of the vehicle and wraps on a top and outboard side around an occupant in front and oblique impacts on the vehicle.

To achieve the foregoing objects, the present invention is a frontal air bag system for a vehicle including an inflator mounted to vehicle structure and a frontal air bag operatively connected to the inflator and mounted to an A-pillar of the vehicle. The frontal air bag system also includes a wrap air bag at least partially continuous with the frontal air bag. The frontal air bag and the wrap air bag are mounted to an A-pillar and header of the vehicle. The frontal air bag and the wrap air bag are inflated by the inflator and the frontal air bag is extended downward and sideways in front of an occupant seated in the vehicle and the wrap air bag is extended above and to an outboard side of the frontal air bag.

One advantage of the present invention is that an improved frontal air bag system is provided for a convertible type vehicle. Another advantage of the present invention is that the frontal air bag system provides an air bag stored behind a trim molding for the A-pillar in the convertible type vehicle. Yet another advantage of the present invention is that the frontal air bag system interfaces with a seat-mounted combination air bag for a convertible type vehicle. Still another advantage of the present invention is that the frontal air bag system is removed from the steering wheel and instrument panel and can be used on the driver and passenger side of the convertible type vehicle. A further advantage of the present invention is that the frontal air bag system may help to provide lower mass, fewer parts, less complexity, easier installation, easier repair after deployment and cost savings. Yet a further advantage of the present invention is that the frontal air bag system substantially commonizes the parts needed for the driver and passenger frontal air bags and simplifies installation for right-hand to left-hand drive vehicles.

Other objects, features and advantages of the present invention will be readily appreciated, as the same becomes better understood after reading the subsequent description taken in conjunction with the accompanying drawings.

BRIEF DESCRIPTION OF THE DRAWINGS

FIG. 1 is a plan elevational view of a frontal air bag system, according to the present invention, illustrated in operational relationship with a convertible type vehicle.

FIG. 2 is a front elevational view of the frontal air bag system and vehicle of FIG. 1.

FIG. 3 is a perspective view of the frontal air bag system illustrated in operational relationship with a passenger occupant and vehicle.

FIG. 6 is view similar to FIG. 5 illustrating a second step of deployment.

FIG. 7 is a view similar to FIG. 5 illustrating a third step of deployment.

DESCRIPTION OF THE PREFERRED EMBODIMENT

Figure 4:
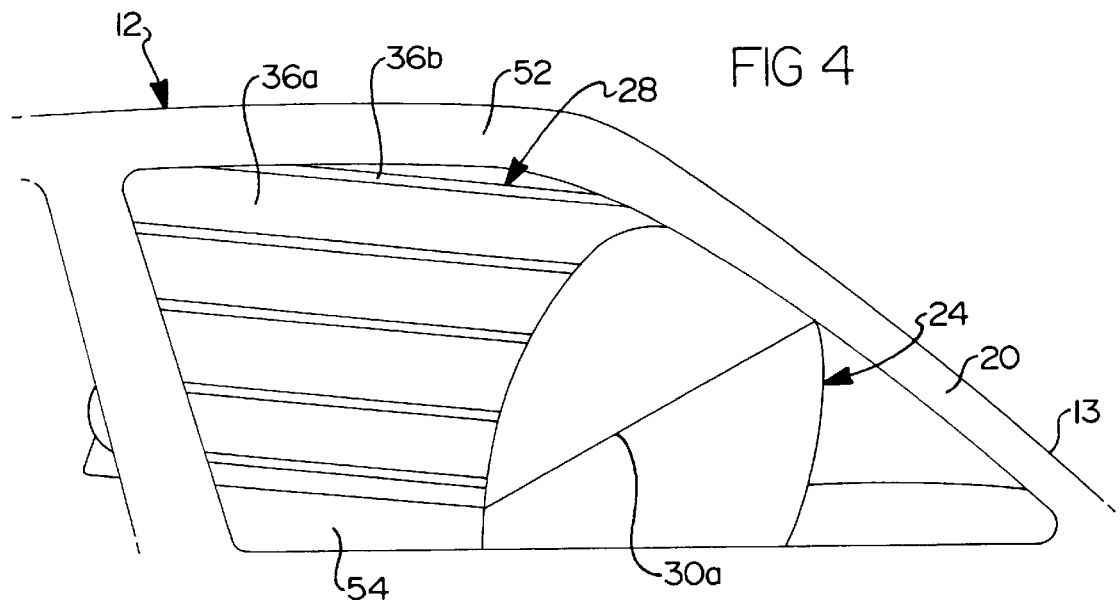
FIG. 4 is an elevational view of the frontal air bag system and vehicle of FIG. 3.

Referring to the drawings and in particular FIGS. 1 through 3, one embodiment of a frontal air bag system 10, according to the present invention, is shown for a vehicle (partially shown), generally indicated at 12. In this embodiment, the vehicle 12 is of a convertible type, which is conventional and known in the art. The vehicle 12 includes a vehicle body 13 and a seat 14 mounted by suitable means to vehicle structure 15 such as a floor pan in an occupant compartment 16 of the vehicle body 13. In this embodiment, the seat 14 is a front seat of the vehicle 12. The vehicle body 13 includes an A-pillar 20 extending upwardly and rearwardly at an angle along each side of the vehicle 12. The vehicle 12 includes a header 20a and an instrument panel 22 extending laterally between the A-pillars 20 and connected to the vehicle body 13. The vehicle 12 also includes a steering wheel (not shown) extending rearwardly from the instrument panel 22 on a driver occupant side of the vehicle 12. An occupant 23 is typically seated in the seat 14 in a normal seating position as indicated by phantom lines and is spaced rearwardly from the instrument panel 22. It should be appreciated that, except for the frontal air bag system 10, the vehicle 12 is conventional and known in the art.

Referring to FIGS. 1 through 3, the frontal air bag system 10, according to the present invention, includes a frontal air bag, generally indicated at 24, for deployment and inflation in front of the occupant 23. The frontal air bag 24 includes one or more panels constructed to form a general or specific shape. In the embodiment illustrated, the frontal air bag 24 includes a front or first panel 25 and a rear or second panel 26. The front panel 25 and rear panel 26 are generally rectangular in shape. As illustrated, the frontal air bag 24 also includes a neck or connecting portion 24a connected to the front panel 25 and rear panel 26. The connecting portion 24a includes an inflator aperture (not shown) centrally located therein for a function to be described. The front panel 25, rear panel 26 and connecting portion 24a are connected or attached together by suitable means such as stitching with a thread material 27 along the perimeter thereof. The front panel 25, rear panel 26 and connecting portion are made of a porous fabric material such as nylon or polyester as is known in the art. It should be appreciated that the frontal air bag 24 could also be one panel sewn to shape or a one-piece woven bag, and may contain one or more internal tethers attached to the A-pillar 20 and opposite side of the frontal air bag 24.

The frontal air bag system 10 also includes a wing or wrap air bag, generally indicated at 28, for inflation above and to the outboard side of the frontal air bag 24. The wrap air bag 28 includes one or more panels constructed to form a general or specific shape. In the embodiment illustrated, the wrap air bag 28 includes an upper or first panel 30 and a side or second panel 32. The upper panel 30 and side panel 32 are generally rectangular in shape. The wrap air bag 28 is connected to the frontal air bag 24. The wrap air bag 28 is partially or fully continuous with the frontal air bag 24, and may include one or more tethers 30a attached to the A-pillar 20, header 20a or other vehicle structure. The upper panel 30 and side panel 32 are connected or attached together by suitable means such as stitching with a thread material 34 along the perimeter. The upper panel 30 and side panel 32 may also be connected together to form a plurality of generally horizontal tubular sections 36a extending longitudinally and spaced laterally by ribs 36b. The tubular sections 36a form a side segment 37 and an upper segment 38 having a generally triangular shape above the frontal air bag 24. The upper panel 30 and side panel 32 are made of a coated fabric material such as nylon or polyester as is known in the art. It should be appreciated that the wrap air bag 28 could also be one panel sewn to shape or a one-piece woven bag.

The frontal air bag system 10 includes an inflator 40 operatively connected to the frontal air bag 24 for inflating the frontal air bag 24 and wrap air bag 28. The inflator 40 is of a suitable type such as a cylindrical hybrid type that is conventional and known in the art. The inflator 40 is disposed in a location remote from the frontal air bag 24 and wrap air bag 28 such as the instrument panel 22. The inflator 40 is connected by suitable means (not shown) to vehicle structure such as the vehicle body 13 or instrument panel 22. The inflator 40 is electrically connected by suitable means such as wires (not shown) to a source of power (not shown) for activating the inflator 40. It should be appreciated that the inflator 40 is activated by the source of power to expel a gas under pressure.

The frontal air bag system 10 may also include a tubular channel 42 extending axially from the inflator 40 and through or attached to the A-pillar 20 and the inflator aperture to be at least partially disposed within the frontal air bag 24. The connecting portion 24a of the frontal air bag 24 is secured to the end of the tubular channel 42 by suitable means such as a clamp (not shown), which is conventional and known in the art. The tubular channel 42 is made of a coated material, plastic or metal, that acts like a channel for the inflation gas to pass from the inflator 40 to the frontal air bag 24 and wrap air bag 28. The tubular channel 42 may include an orifice 44 to allow a faster fill of the wrap air bag 28 and later fill of the frontal air bag 24 to preferentially inflate the wrap air bag 28 earlier than the frontal air bag 24. The tubular channel 42 may also include a one-way valve 46 to hold pressure in the wrap air bag 28 for several seconds. It should be appreciated that the wrap air bag 28 may be fully integrated with the frontal air bag 24 or a fully stand-alone air bag system which is connected to a separate inflator, tubular channel and packaging from the frontal air bag 24. It should also be appreciated that the wrap air bag 28 could be used with a conventional front air bag on the steering wheel or instrument panel.

The frontal air bag system 10 also includes a trim molding (not shown) attached to the A-pillar 20 for covering and housing the frontal air bag 24 and wrap air bag 28. The trim molding is made of a suitable material such as plastic and extends laterally and longitudinally. The trim molding is attached by suitable means such as fasteners (not shown) to the A-pillar 20. It should be appreciated that the trim molding may be attached to the A-pillar 20 by other suitable means such as an adhesive or sonic welding.

In operation, the frontal air bag system 10 has the frontal air bag 24 and wrap air bag 28 mounted in the A-pillar 20 and/or header 20a of the vehicle body 13 in a folded stowed position behind the trim molding. When the vehicle experiences a collision-indicating condition of at least a predetermined threshold level, the inflator 40 is activated and a gas is expelled into the wrap air bag 28. Gas enters the wrap air bag 28 and is inflated behind the trim molding to move the trim molding inboard to disengage the A-pillar 20 and header 20a. The wrap air bag 28 extends through an opening between the trim molding and A-pillar 20 and header 20a.

Figure 5:
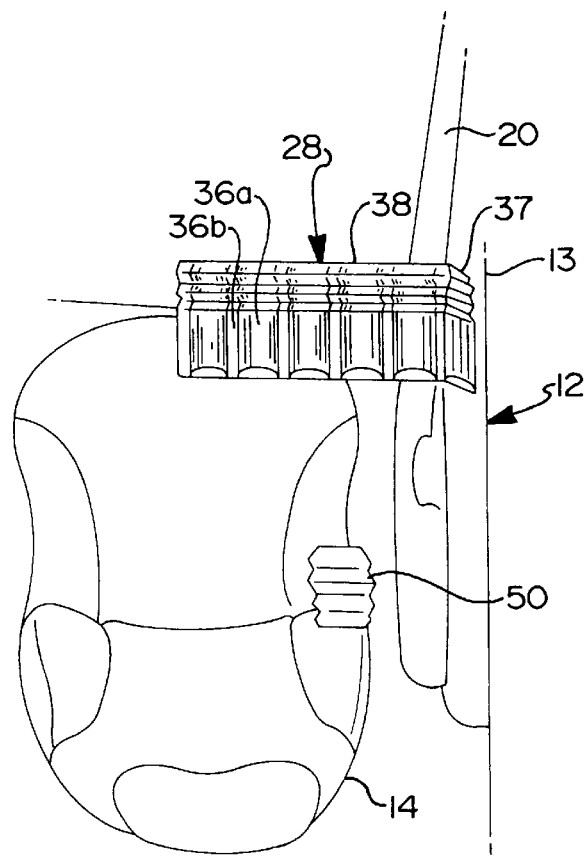
FIG. 5 is a plan view of the frontal air bag system of FIGS. 1 through 4 illustrating a first step of deployment.

By seven (7) to ten (10) milliseconds after a signal triggering actuation of the frontal air bag system 10, the wrap air bag 28 starts to inflate and deploy rearward into the occupant compartment 16 of the vehicle 12 as illustrated in FIG. 5. Simultaneously, a seat-mounted combination head/torso or torso side air bag 50 is inflated and extends forward along an outboard side of the seat 14. It should be appreciated that the side air bag 50 is conventional and known in the art.

By fifteen (15) to twenty (20) milliseconds after the signal triggering actuation of the frontal air bag system 10, the wrap air bag 28 is fully inflated and under full pressure. The coated fabric of the upper and lower panels 30 and 32 allows the inflation of the wrap air bag 28 via the one-way valve (not shown) to be held for several seconds. The frontal air bag 24 is starting to inflate as illustrated in FIG. 6. Simultaneously, the side air bag 50 extends further forwardly.

By twenty (20) to forty (40) milliseconds after the signal triggering actuation of the frontal air bag system 10, the frontal air bag 24 is fully inflated and starting to deflate due to porosity of the fabric as illustrated in FIG. 7. Simultaneously, the seat-mounted combination head/torso or torso air bag 50 is fully inflated and extended forwardly. It should be appreciated that the frontal air bag 24 and side air bag 50 inflate at the same times as conventional systems, assuring similar inflation performance.

When a convertible top 52 is up, the side segment 37 lays against a side window 54 of the vehicle 12 and the upper segment 38 lays against an interior surface of the convertible top 52 as illustrated in FIG. 4. When the convertible top 52 is down, the side segment 37 and top segment 38 are freestanding, but gain support from their interconnections along the header 20a, A-pillar 20 and tethers 30a and the stored pressure inside. It should be appreciated that the overall effect of the frontal air bag system 10 is to cushion head impacts of the occupant 23 in various frontal through side impacts of the vehicle 12 and also enhance to some degree containment of the head of the occupant 23, even with the convertible top 52 down.

Accordingly, the frontal air bag system 10 places the front and forward portion of a side air bag in a single module on the A-pillar 20. In an impact, the frontal air bag system 10 inflates with a seat-mounted combination head/torso air bag 50. The wrap air bag 28 is continuous with the frontal air bag 244, which is porous and inflates at the same time as a conventional frontal air bag. The connection between the two air bags 24 and 28 provides a wrap around system for the occupant 23 to prevent the occupant 23 from striking the A-pillar 20.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed:

1. A frontal air bag system for a vehicle comprising:
   an inflator mounted to vehicle structure;
   a frontal air bag operatively connected to said inflator; and
   a wrap air bag at least partially continuous with said frontal air bag, said frontal air bag and said wrap air bag being mounted to an A-pillar and header of the vehicle, wherein said frontal air bag and said wrap air bag are inflated by said inflator and said frontal air bag is extended downward and in front of an occupant seated in the vehicle and said wrap air bag is extended above and to an outboard side of said frontal air bag.

2. A frontal air bag system as set forth in claim 1 wherein said frontal air bag comprises at least one panel made of a porous fabric material.

3. A frontal air bag system as set forth in claim 1 wherein said wrap air bag comprises at least one panel made of a coated fabric material.

4. A frontal air bag system as set forth in claim 1 including a tubular channel in the A-pillar extending between said inflator and said frontal air bag.

5. A frontal air bag system as set forth in claim 1 wherein said inflator is remotely located on the vehicle structure from the A-pillar.

6. A frontal air bag system as set forth in claim 1 wherein said wrap air bag has a side segment and an upper segment forming a generally triangular shape.

7. A frontal air bag system as set forth in claim 1 wherein said wrap air bag includes a plurality of tubular sections extending longitudinally and a plurality of ribs spacing said tubular sections laterally.

8. A frontal air bag system as set forth in claim 1 wherein said frontal air bag and said wrap air bag are mounted to the A-pillar and header on a driver side of the vehicle.

9. A frontal air bag system as set forth in claim 1 wherein said frontal air bag and said wrap air bag are mounted to the A-pillar and header on a passenger side of the vehicle.

10. A frontal air bag system as set forth in claim 1 wherein said wrap air bag is generally rectangular in shape.

11. A frontal air bag system as set forth in claim 1 including an orifice to allow said wrap air bag the inflated before said frontal air bag and a one-way valve to hold inflation pressure in said wrap air bag.

12. A frontal air bag system for a convertible type vehicle comprising:
    an inflator remotely mounted to vehicle structure;
    a tubular channel connected to said inflator and extending along an A-pillar of the vehicle;
    a frontal air bag operatively connected to said tubular channel and mounted to the A-pillar; and
    a wrap air bag connected to the frontal air bag and mounted to the A-pillar, wherein said frontal air bag and said wrap air bag are inflated by said inflator and said frontal air bag is extended downward and in front of an occupant seated in the vehicle and said wrap air bag is extended above said frontal air bag.

13. A frontal air bag system as set forth in claim 12 wherein said air bag is mounted to the A-pillar on a driver side of the vehicle.

14. A frontal air bag system as set forth in claim 12 wherein said air bag is mounted to the A-pillar on a passenger side of the vehicle.

15. A frontal air bag system as set forth in claim 12 wherein said wrap air bag has a side segment and an upper segment forming a generally triangular shape.

16. A frontal air bag system as set forth in claim 12 wherein said wrap air bag includes a plurality of tubular sections extending longitudinally and a plurality of ribs spacing said tubular sections laterally.

17. A frontal air bag system as set forth in claim 12 wherein said air bag comprises a first panel and a second panel being connected together and generally rectangular in shape.

18. A frontal air bag system as set forth in claim 12 wherein said wrap air bag comprises at least one panel made of a coated fabric material.

19. A frontal air bag system as set forth in claim 18 wherein said frontal air bag comprises at least one panel made of a porous fabric material.

20. A frontal air bag system for a convertible type vehicle comprising:
    an inflator remotely mounted to vehicle structure;
    a tubular channel connected to said inflator and extending along an A-pillar of the vehicle;
    a frontal air bag having at least one panel made of a porous fabric material and being operatively connected to said tubular channel, said frontal air bag being mounted adjacent to the A-pillar; and a wrap air bag having at least one panel made of a coated fabric material connected to said frontal air bag and mounted to the A-pillar, said wrap air bag having a side segment and an upper segment forming a generally triangular shape with a plurality of tubular sections extending longitudinally and a plurality of ribs spacing said tubular sections laterally, wherein said frontal air bag and said wrap air bag are inflated by said inflator and said frontal air bag is extended downward and in front of an occupant seated in the vehicle and said wrap air bag is extended above said frontal air bag.

21. A frontal air bag system for a vehicle comprising:

a first inflator mounted to vehicle structure;

a frontal air bag operatively connected to said first inflator;

a second inflator mounted to vehicle structure; and a wrap air bag operatively connected to said second inflator, wherein said frontal air bag and said wrap air bag are mounted either one of jointly or separately to an A-pillar and header of the vehicle, wherein said frontal air bag and said wrap air bag are inflated by said first inflator and said second inflator, and said frontal air bag is extended downward and in front of an occupant seated in the vehicle and said wrap air bag is extended above and to an outboard side of said frontal air bag.

* * * * *